Aug. 31, 1926.  1,598,288

LE ROY LAYTON ET AL

GATE VALVE

Filed May 2, 1925

Inventors
LE ROY LAYTON AND
DUDLEY C. PRESTON

By

Attorney

Patented Aug. 31, 1926.

1,598,288

UNITED STATES PATENT OFFICE.

LE ROY LAYTON AND DUDLEY C. PRESTON, OF PHILADELPHIA, PENNSYLVANIA, ASSIGNORS TO TIOGA STEEL AND IRON COMPANY, OF PHILADELPHIA, PENNSYLVANIA, A CORPORATION OF PENNSYLVANIA.

GATE VALVE.

Application filed May 2, 1925. Serial No. 27,458.

Our invention relates more particularly to gate valves intended for service conditions involving high pressure and high temperature. For the purpose of coping with such conditions and to minimize leakage it has heretofore been standard practice to provide the seating faces with a substantially mirror like finish. Aside from the fact that this is expensive, it is extremely difficult to obtain a flush fit especially with seating faces of relatively large area because any minute inaccuracy of finish makes for leakage, under high pressure and in response to temperature changes, and even with an initial flush fit there is a constant liability of it being destroyed by the action of grit.

Objects of our invention are to correct the faults of the old practice; to eliminate the necessity of mirror like finishing; to provide a construction whereby the gate will find a true seat at all times regardless of any permissible inaccuracy of fit and regardless of wear; and to provide a construction which will be of leakage proof despite the presence of foreign substances of the nature of grit or abrasive material, but which possesses the merit of rejecting or trapping such material.

Figure 1:
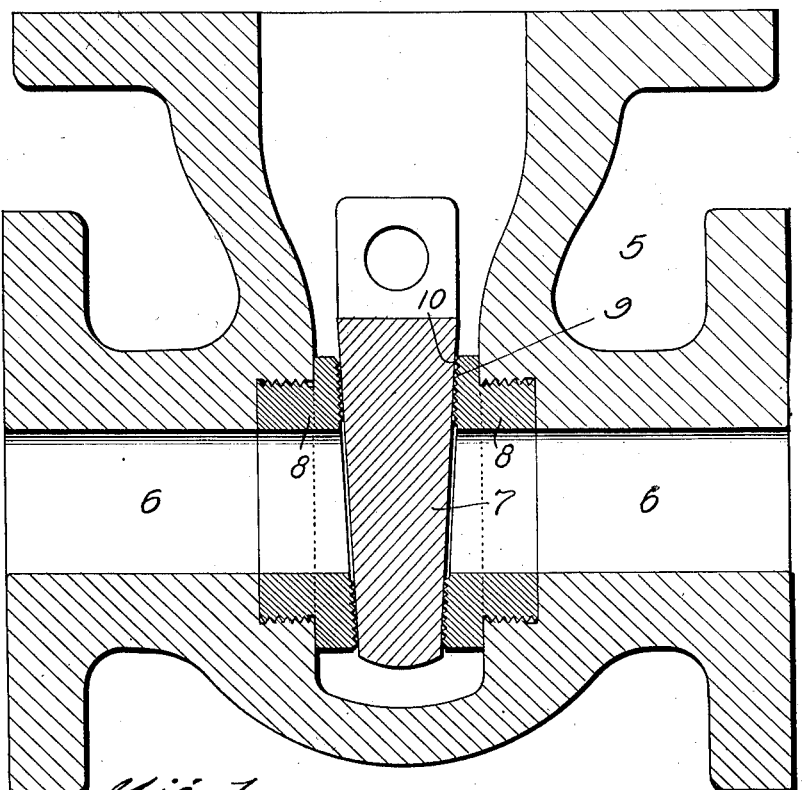
Figure 2:
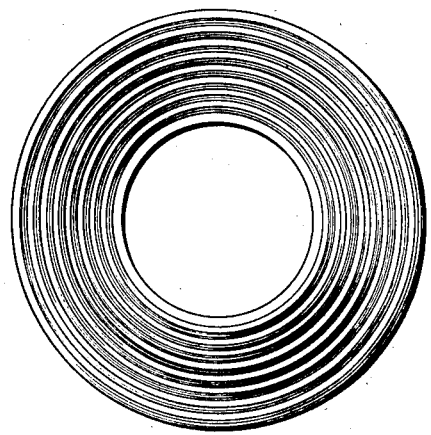
Figure 3:
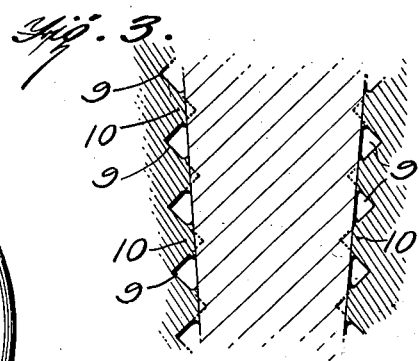

The nature, characteristic features and scope of the invention will more readily be understood from the following description, taken in connection with the accompanying drawing, illustrative of the preferred embodiment and wherein Fig. 1 is a sectional view of a valve equipped with a wedge gate seated according to our invention, Fig. 2 is a face view of one of the seats, and Fig. 3 is a sectional view of the gate and seats with our improved seating elements shown somewhat on an exaggerated scale and after a period of use.

In the drawings, the numeral 5 represents a valve body having a fluid way 6. 7 represents a wedge gate, and 8 represents the seating provision for the gate. Except as hereinafter stated, these elements are or may be as usual.

According to our invention the gate or its seat is formed or provided with a plurality of concentric grooves 9 forming independent seats. In the present instance and for simplicity they are established in the valve body, for example, in the seating rings 8 by intact concentric walls or ridges 10, which are preferably dispersed over the entire seating surface of the ring. Evidently the ridges both individually and collectively constitute elements with which the gate will always find a true seat, while the grooves constitute trapping provisions for any leakage fluid and for any gritty substances that may adhere to the gate.

The body working against the concentrically disposed walls or ridges in this instance the gate, is preferably formed of relatively harder metal so that in service the tops of the walls which initially are of substantially saw tooth form in cross-section become distorted or flattened and hence relative wear of the parts tends to increase rather than decrease the true seating insurance afforded by the multiple arrangement of walls.

Having described our invention, we claim:

In combination, a gate valve, and a member cooperating therewith, said elements having lapping faces whereof one is relatively hard and finished in a continuous plane and whereof the other has concentric grooves the defining walls of which are of saw-tooth formation to provide independent seating ridges whose seating capacity is increased by wear.

In testimony whereof we affix our signatures.

LE ROY LAYTON.
DUDLEY C. PRESTON.